United States Patent [19]
Peters

[11] Patent Number: 6,079,914
[45] Date of Patent: Jun. 27, 2000

[54] UNIVERSAL DRILL JIGS

[76] Inventor: Leroy W. Peters, 4280 Shadowrock Ct., Gurnee, Ill. 60031

[21] Appl. No.: 09/266,444

[22] Filed: Mar. 11, 1999

[51] Int. Cl.[7] .................................................. B23B 49/02
[52] U.S. Cl. ........................ 408/92; 408/103; 408/115 R
[58] Field of Search ............................ 408/92, 97, 103, 408/115 R, 115 B

[56] References Cited

U.S. PATENT DOCUMENTS

| | | | |
|---|---|---|---|
| 2,355,263 | 8/1944 | Bloomfield | 77/13 |
| 2,466,023 | 4/1949 | Griffin | 77/62 |
| 2,698,547 | 1/1955 | Armacost | 77/62 |
| 2,725,639 | 12/1955 | Yungman | 33/191 |
| 2,780,946 | 2/1957 | McGuire | 77/62 |
| 2,804,788 | 9/1957 | Humphrey | 77/62 |
| 2,843,167 | 7/1958 | Rushton | 408/115 R |
| 2,898,785 | 8/1959 | Quick et al. | 408/115 R |
| 2,920,509 | 1/1960 | Bennett | 77/62 |
| 3,097,891 | 7/1963 | Brideau | 308/4 |
| 4,474,514 | 10/1984 | Jensen | 408/115 |
| 4,715,125 | 12/1987 | Livick | 408/115 R |
| 4,752,162 | 6/1988 | Groh | 408/115 |
| 4,813,826 | 3/1989 | Riedel | 408/115 R |
| 4,986,702 | 1/1991 | McKinney | 408/54 |
| 5,114,285 | 5/1992 | Brydon | 408/115 |
| 5,116,170 | 5/1992 | Palmer et al. | 408/72 |
| 5,222,845 | 6/1993 | Goldstein et al. | 408/103 |
| 5,569,001 | 10/1996 | Brutscher et al. | 408/115 |
| 5,573,352 | 11/1996 | Matadobra | 409/132 |
| 5,664,913 | 9/1997 | Scholz | 408/72 |
| 5,672,034 | 9/1997 | McLean | 408/79 |
| 5,733,077 | 3/1998 | MacIntosh, Jr. | 408/103 |

FOREIGN PATENT DOCUMENTS

| | | | |
|---|---|---|---|
| 548812 | 10/1942 | United Kingdom . | |
| 793954 | 4/1958 | United Kingdom | 408/115 R |

*Primary Examiner*—Daniel W. Howell
*Attorney, Agent, or Firm*—Trexler, Bushnell, Giangiorgi, Blackstone, Ltd.

[57] ABSTRACT

An adjustable drill jig for forming door hardware mounting holes is described. The drill jig of the present invention includes a first plate adapted for placement against a first side of the door. A second plate is attached to the first plate via a chain linkage. The second plate is adapted for placement against a second opposite side of the door in a position aligned with and parallel to the first plate. Alignment means connected to the first plate and capable of attachment to the second plate ensure the two plates are aligned. The first and second plates each define a plurality of drill guide holes. The drill guide holes of the second plate are aligned with correspondingly sized drill guide holes of the first plate when the first and second plates are aligned. A plurality of bushing plates are also provided. Each bushing plate is capable of attachment to the first plate. Each bushing plate carries a predetermined pattern of drill bushings corresponding to a particular type of door hardware. A preselected one of the bushing plates is removably attached to the first plate in accordance with the particular type of door hardware being installed. Each bushing plate is attached to the first plate so that each drill bushing on the bushing plate is received in a correspondingly sized drill guide hole of the first plate.

23 Claims, 7 Drawing Sheets

UNIVERSAL DRILL JIGS

FIELD OF THE INVENTION

This invention relates to drill jigs and in particular to an improved adjustable drill jig for enabling the accurate drilling of holes through doors.

BACKGROUND TO THE INVENTION

The use of drill jigs or drilling templates to aid in the installation of door operating hardware is well known. Door operating hardware, e.g., door knobs and locks, is usually mounted on a door using through bolts. The through bolts engage mounting plates on either side of a door. Through holes must be provided in the door for these through bolts, as well as for other parts of the door operating hardware.

Proper installation of the door operating hardware requires accurate formation of these mounting holes. The mounting holes not only must be formed in the right place, but also must be formed perpendicular or "square" to the side of the door.

Additionally, the mounting holes must be drilled entirely through a door so that the screws or bolts placed in these holes can interconnect the hardware parts that go on the exterior side of the door with those that go on the interior side of the door.

The relative thickness of a door, the tendency of a drill to walk, and error in human judgement, however, make the accurate formation of these holes a very difficult task. Unfortunately, failure to drill accurate holes can have severe consequences. For example, if the hole centers are not properly positioned, installation of, e.g., a handle or dead bolt lock, becomes very difficult and often requires enlarging the hole diameter, thereby resulting in a sloppy fit. If the installation handles are not drilled through the door exactly square, the interior and exterior parts of the door hardware will not be properly interconnected. Even if the holes are only slightly off-square, they usually have to be redrilled oversize or reamed out to enable the handle or lock to be installed and operate freely. However, if the holes are badly off square, a fix may be impossible without ruining the appearance of the door.

Because of the difficulty of drilling accurate mounting holes, a drilling aid in the form of a drill jig or drilling template is usually provided with purchased door hardware. These drilling aids usually comprise a paper or light cardboard template, The templates are taped to the door or held in place manually in the location where a handle or lock is to be installed. Using a pointed instrument, such as an awl or center punch, the centers of the required holes to be drilled, can be marked on the door.

Plastic jigs or templates are also known. Such plastic jigs may include drill bushings for guiding a drill bit through a door and providing a specified distance between mounting holes. Such drill jigs are typically clamped to the door with an external clamp in the location where the door hardware, e.g., a dead bolt, is to be installed. A drill bit is inserted through the drill bushings to form the required mounting holes.

The prior art drill jigs and drilling templates suffer from a number of disadvantages. In particular, using a paper template, it is easy to mismark the hole locations. Paper templates also only provide marking points for the mounting holes. Paper templates still allow improper alignment, perpendicularity or sizing of the mounting holes. Additionally, paper templates provide no protection from damage to a door that might occur during a drilling operation. Paper templates are difficult to position properly on the door. They also easily tear and crease making them difficult to use. The fragility of paper templates also makes them unsuitable for repeated use. This inability to reuse a template is particularly irksome in the construction of an office or apartment building, where many sets of door hardware have to be installed. It can also be troublesome for the homeowner whose first attempt at marking the mounting holes has been unsuccessful and who therefore needs to reuse the template.

Plastic templates or jigs provide some advantages over paper templates. In particular, they are more durable and aid in the proper sizing and positioning of mounting holes. However, plastic templates also suffer from a large number of disadvantages. For example, by the time a plastic template is used for a second or third time, it tends to become warm and flexible during the drilling operation. This leads to inaccuracies in the size and positioning of the mounting holes. The high stresses created during a drilling operation also usually mean that plastic jigs tend to break after only four or five uses. Additionally, even though a plastic jig may be reusable, it can typically be used only with one particular type of door hardware and one type of door. This can be inconvenient during construction where many types of door hardware and doors may have to be installed. It can also be inconvenient for carpenters or contractors or the like who install many types of door hardware and doors in the course of their employment. Like paper templates, plastic jigs, too, are difficult to position properly and require the use of external mounting devices such as C-clamps. Likewise they provide no protection from damage incurred during a drilling operation. The holes formed using a plastic jig are also susceptible to inaccuracy because of the manner in which plastic drill jigs require a hole to be drilled. Specifically, a plastic jig is first put on one side of the door and a hole is drilled through half of the door thickness. The plastic jig is then placed on the opposite side of the door, hopefully so that the bushing on the plastic jig is aligned with the previously drilled hole, and the door is again drilled halfway through in order to form a through hole. Thus, the installation procedure using a plastic jig is awkward and inefficient. Moreover, with plastic jigs substantial opportunity exists that the plastic jig will be misaligned and that proper through holes will not be formed.

OBJECTS AND SUMMARY OF THE INVENTION

Accordingly, it is an object of the present invention to provide an improved drill jig for accurately drilling holes in doors.

It is a related object of the present invention to provide an improved jig for the installation of door hardware.

It is another object of the present invention to provide an improved drill jig which is durable and suitable for repeated use.

It is a further object of the present invention to provide a universal or adjustable drill jug suitable for use with a variety of door hardware and a variety of doors.

An additional object of the present invention is to provide a drill jig which allows drilling operations to be performed from one side of a door only.

A further object of the present invention is to provide a drill jig which reduces the time required for drilling holes in doors and the time required for the installation of door hardware.

Another object of the present invention is to provide a drill jig which prevents or at least minimizes damage to doors incurred during a drilling operation.

Yet another object of the present invention is to provide which is simple to use and easily to properly position on a door.

It is a related object of the present invention to provide a drill jig including integral attaching means for attaching the jig to a door.

An additional object of the present invention is to provide a drill jig which is stable and secure during a drilling operation.

A further object of the present invention is to provide a drill jig which is simple in construction and easy to manufacture.

Further objects and advantages will become apparent from the ensuing description.

Accordingly the present invention provides an adjustable drill jig forming door operating hardware mounting holes. The drill jig of the present invention includes a first plate which is placed against a first side of the door and a second plate which is placed against a second opposite side of the door. The first plate defines a plurality of first drill guide holes and the second plate defines a plurality of second drill guide holes. The second plate is placed against the second opposite side of the door in a position substantially parallel and aligned with that of the first plate. The second plate is also positioned against the second side of the door so that the second drill guide holes are aligned with the first drill guide holes of the first plate. The second drill guide holes are arranged so that each second drill guide hole is aligned with a correspondingly sized first drill guide hole. A chain linkage connects the second plate to the first plate. The chain linkage is placed around the edge of the door when the first plate is placed against the first side of the door and the second plate is placed against the second opposite side of the door. Alignment means are provided for ensuring that the second plate is aligned with the first plate, when the first and second plates are placed respectively against the first and second sides of the door. The alignment means is connected to the first plate and capable of attachment to the second plate. A plurality of bushing plates are also provided which are capable of attachment to the first plate. Each of the bushing plates carries a predetermined pattern of drill bushings corresponding to a mounting hole pattern for a particular type of door hardware. Each bushing plate is adapted for attachment to the first plate so that each of the drill bushings on the bushing plate is received in a correspondingly sized drill guide hole of the first plate. A preselected one of the bushing plates is removably attached to the first plate in accordance with the particular type of door hardware being installed.

BRIEF DESCRIPTION OF THE DRAWINGS

The present invention will now be described by way of example with reference to the accompanying drawings in which.

DETAILED DESCRIPTION OF A PREFERRED EMBODIMENT

Figure 1:
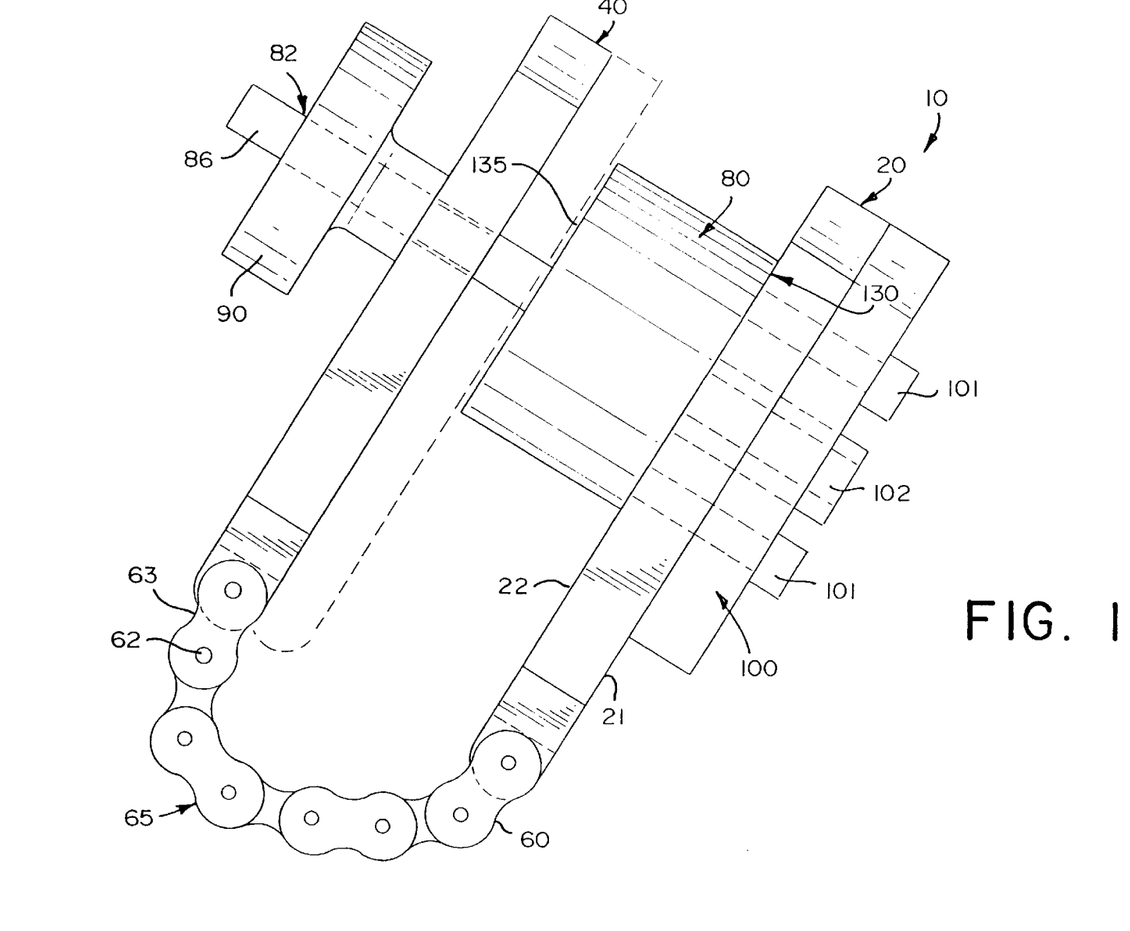
FIG. 1 is a side elevational view of a universal drill jig according to the invention.

Reference is now invited to FIG. 1 which shows a universal or adjustable jig assembly 10 according to the invention. FIG. 1 shows the jig assembly 10 in assembled form or operative condition. As illustrated, the assembly 10 includes a first or sub-plate 20 and a second or back-up plate 40. The sub-plate 20 and back-up plate 40 are connected by a chain linkage 60. Only one such chain linkage 60 can be seen in FIG. 1. However, an additional chain linkage 60 also connects the sub-plate 20 and back-up plate 40 on the opposite side of the assembly 10. In the assembled or operative state shown in FIG. 1, the sub-plate 20 and back-up plate 40 are also connected by a pilot member 80. The pilot member 80 receives a lock nut or knob 90, which secures the assembly 10 to a door (not illustrated). The assembly 10 may also include a bushing plate 100. The bushing plate 100, which is attached to the sub-plate 20, carries a plurality of drill bushings 102.

In a preferred embodiment, the plates 20, 40, and 100 are preferably formed of aluminum and the drill bushings 102 of steel. Constructing the jig 10 in this manner gives the jig 10 strength and durability. In particular, the jig 10 should be able to be used over and over again without breaking or needing repair. It will be apparent to those skilled in the art, however, that other materials could be used without departing from the spirit of the invention, as long as the materials are durable.

In use, the sub-plate 20 with bushing plate 100 attached is positioned on a first or an exterior side of the door. The back-up plate 40 is positioned on a second opposite or an interior side of the door. The chain linkages 60 surround an edge of the door. Specifically, the sub-plate 20, with bushing plate 100 attached, is placed against the exterior side of the door so that the pilot member 80 is inserted snugly through a main bore drilled in the door. The pilot member 80 is inserted through the main bore so that alignment means 82 and alignment members 83 (see FIG. 6) which are attached to the pilot member 80 protrude from the second opposite or interior side of the door. The back-up plate 40 is placed against the second opposite side or interior side of the door in a position substantially parallel to and in alignment with the sub-plate 20. The back up-plate 40 is also positioned so that it receives alignment members 82, 83 in a recess 41 and holes 42 formed therein. The alignment members 82, 83 ensure that the back-up plate 40 is properly positioned with respect to the sub-plate 20; i.e., they ensure that these two plates 20, 40 are aligned with and parallel to each other. Specifically, if the back-up plate 40 were not properly aligned with respect to the sub-plate 20, the recess 41 and holes 42 would not be positioned to receive the alignment members 82, 83.

Now that the general construction of the present invention has been described, the components of the assembly 10 will be examined in greater detail. First attention will be directed to the sub-plate 20 of the present invention. In this regard, reference is invited to FIGS. 1, 2, and 3.

Figure 2:
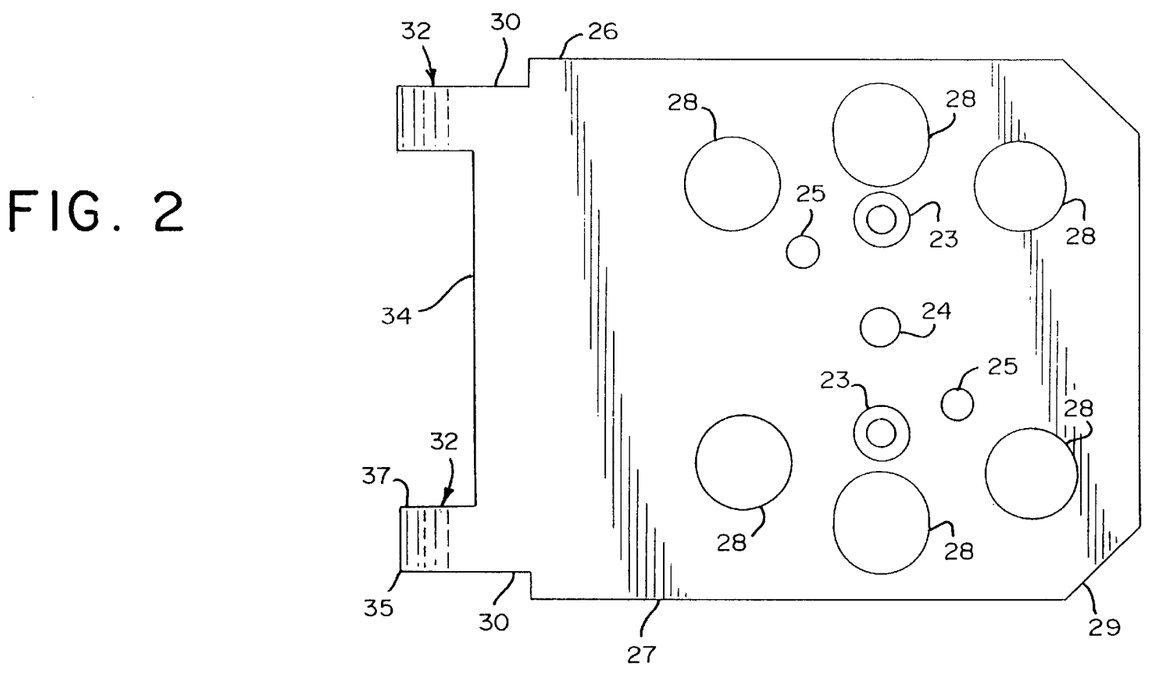
FIG. 2 is a top plan view of a sub-plate according to the invention.

As illustrated in FIG. 1, the sub-plate 20 is attached to the bushing plate 100 and pilot member 80. The sub-plate 20 includes a front face or surface 21 and a rear face or surface 22. The front face or surface 21 of the sub-plate 20 contacts the bushing plate 100. The back-surface or face 22 contacts the pilot member 80. A plurality of holes 23, 24, and 25 are provided in the sub-plate 20 for attaching the bushing plate 100 and pilot member 80 to the sub-plate 20. The holes 23, 24, and 25, which are shown in FIG. 2, are preferably generally circular. It is also preferred that the holes 23, 24, and 25 are perpendicular through holes; i.e., they extend from the front surface 21 to the back surface 22 in a direction normal to the surfaces 21, 22.

The pair of holes 23 and a central hole 24 are provided for attaching the pilot member 80 to the sub-plate 20. In particular, the central hole 24 receives the alignment means 82 of the pilot member 80. As can best be seen in FIG. 1, the alignment means 82, which is positioned substantially in the center of the pilot 80, extends through a substantially central through bore 81 in the pilot member 80 and into the central hole 24 of the sub-plate 20. In a preferred embodiment, the central alignment means 82 also extends from the central hole 24 of the sub-plate 20 into a bore 103 of a bushing plate 100. It is also preferred that the central hole 24 be positioned at a midpoint between the edges 26, 27 of the sub-plate 20.

The holes 23 are provided on either side of the central hole 24. Preferably the holes 23 are spaced substantially equidistantly from the central hole 24. The holes 23 are aligned with corresponding holes 84 in the pilot member 80. The holes 23 preferably receive two flat-head screws for securing the pilot member 80 to the sub-plate 20. In this regard the holes 23 may be internally threaded for receiving the screws.

The holes 25 are also provided on either side of the central hole 24. Preferably, the holes 25 are also positioned substantially equidistantly from the central hole 24. The holes 25 are provided for attaching a bushing plate 100 to sub-plate 20. Specifically, the holes 25 receive screws 101 which secure a bushing plate 100 to the sub-plate 20. In this regard, the holes 25 may be internally threaded. Preferably, the holes 25 are adapted to receive one-quarter inch screws.

The sub-plate 20 also includes a plurality of drill guide holes 28. The drill guide-holes 28 receive a correspondingly sized drill bit so that properly positioned and accurately sized mounting holes are formed. As illustrated in FIG. 2, the drill guide holes 28 substantially circumscribe the holes 23, 24, 25 and are positioned in peripheral regions of the sub-plate 20. The drill guide holes 28 are preferably generally circular. It is also preferred that the drill guide holes 28 comprise perpendicular through holes.

The drill guide holes 28 are positioned for alignment with the drill bushings 102 on the bushing plates 100. Specifically, when a bushing plate 100 is attached to the sub-plate 20 with screws 101, each of the drill bushings 102 on the bushing plate 100 will be aligned with and received in a drill guide hole 28 of the sub-plate 20. In a preferred embodiment, the drill guide holes 28 are dimensioned and positioned so that each of the drill bushings 102 will slip through a correspondingly sized drill guide hole 28 and rest against the door. In this manner, an unobstructed passage through a bushing plate 100 and the sub-plate 20 is created for a drill bit.

The drill guide holes 28 are each preferably five-eighths of an inch in diameter. The outside diameter of each of the drill bushings 102 is also preferably five-eighths of an inch. The inside diameter of the drill bushings 102, of course, varies so that different sized drill bits can be used and hence different sized mounting holes can be formed. However, it is preferred that the drill bushings 102 are each one and one-quarter inch long.

In the illustrated embodiment, six drill guide holes 28 are provided. These six drill guide holes 28 allow three different bushing plates 100, each carrying a different pattern of drill bushings 102, to be attached to the sub-plate 20. In this manner door hardware mounting holes of varying size and having a variable spacing between them may be easily and accurately formed. Advantageously, the ability to adapt the size of and spacing between mounting holes means that the jig assembly 10 of the present invention can be used in the installation of a variety of door hardware. In a preferred embodiment, the drill bushings 102 of the bushing plates 100 are constructed so that the jig assembly 10 could be used to install SCHLAGE, BESTLOCK, CORBIN RUSSWIN, and SARGENT AND COMPANY deadlocks. It will be apparent to those skilled in the art, however, that a greater number or fewer drill guide holes 28 could be provided and that the arrangement of the drill guide holes 28 could be varied to accommodate other types of hardware without departing from the spirit of the invention.

Figure 3:
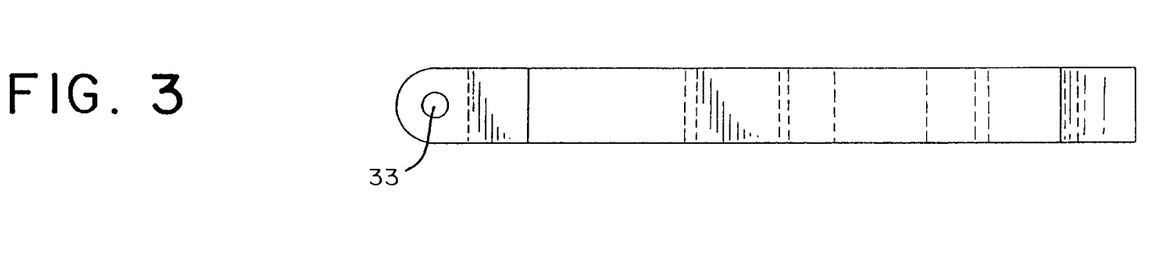
FIG. 3 is a side elevational view of the sub plate according to the invention.

The sub-plate 20 also includes beveled edges 29 and cut-away corners 30. Arm portions 32 extend from these cut-away corners 30. As best seen in FIG. 3, a bore 33 is drilled through a central portion of each of the arm portions 32. The bore 33 is drilled so that it extends in a direction parallel to a bottom edge 34 of the sub-plate 20. That is, it extends from an outside face 35 to an inside face 37 of the arm portion 32 in a direction parallel to the bottom edge 34. The bore 33 is preferably a through bore and generally circular.

The bore 33 in each of the arm portions 32 is provided for attaching a chain linkage 60 to the sub-plate 20. In particular, the bores 33 receive pins 62 which secure plate members 63 (see FIG. 1) of the chain linkage 60 to the arm portion 32. Two pins are received in each bore 33. The pins 62 are inserted into the bore 33 from opposite faces or sides 35, 37 of the arm portion 32.

Figure 4:
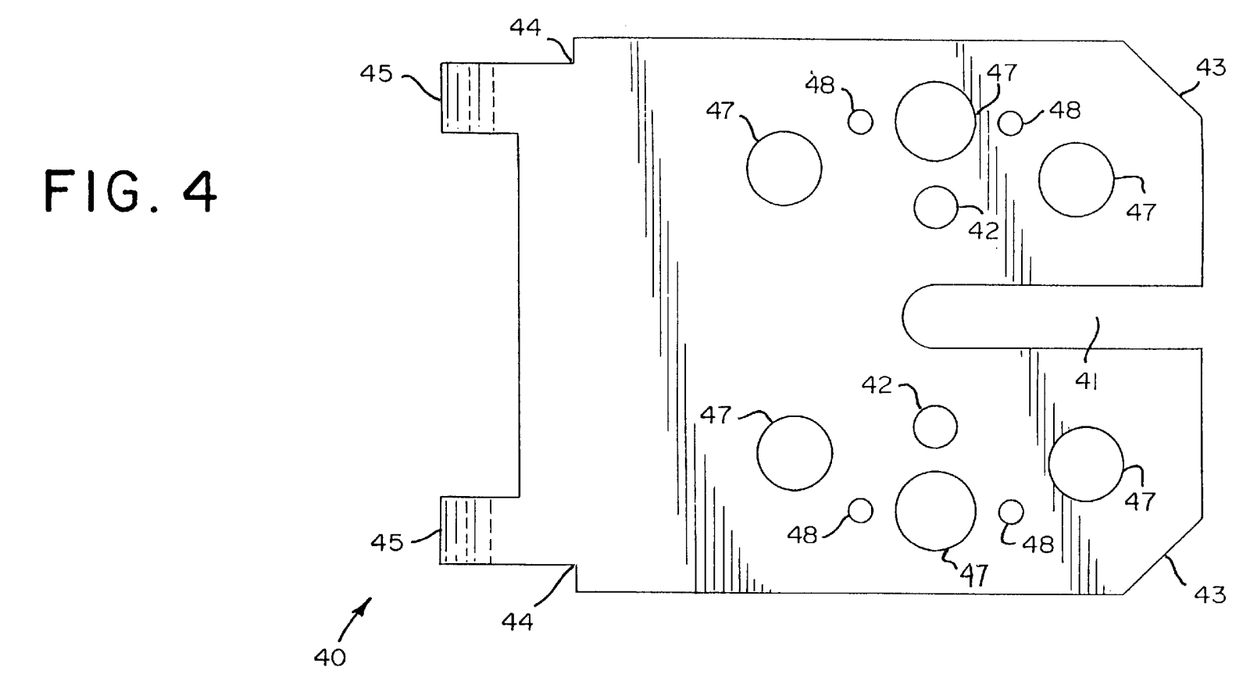
FIG. 4 is a top plan view of a back-up plate according to the invention.
Figure 5:
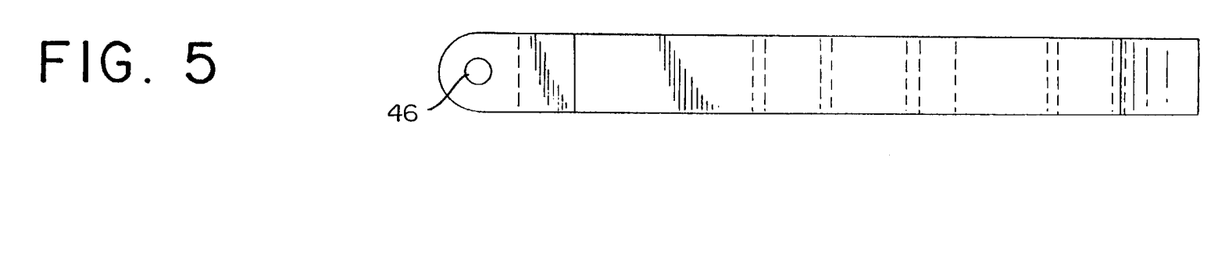
FIG. 5 is a side elevational view of the back-up plate according to the invention.

Attention will now be directed to the back-up plate 40 of the present invention. As best seen in FIG. 4, the back-up plate 40 is substantially the same size and shape as the sub-plate 20. Like, the sub-plate 20, the back-up plate 40 also includes beveled edges 43 and cutaway corners 44. Arm portions 45 also extend from the cutaway corners 44. The arm portions 45 (see FIG.5) also have bores 46 formed therein for attaching the chain linkages 60 to the back-up plate 40, and thereby connecting the back-up plate 40 to the sub-plate 20. The similarity in size and shape is preferred because it helps ensure the two plates 20, 40 are aligned during a drilling operation.

The back-up plate 40 also includes the recess 41. The recess 41 preferably comprises a U-shaped channel or notch. Of course, other shapes could be used without departing from the invention. The recess 41 receives the alignment means 82 of the pilot member 80. Specifically, in use, when the pilot member 80 is inserted through a main bore of the door to locate the sub-plate 20 against the exterior side of the door, the alignment means 82 will protrude from the opposite interior side of the door. The protruding alignment means 82 is received in the recess 41 of the aligned back-up plate 20, which is placed in contact with the interior side of the door. Accordingly, the width of the recess 41 is chosen to accommodate the alignment means 82. The recess 41 is positioned in a central region of the back-up plate 40.

The back-up plate 40 also includes holes 42 positioned on either side of the recess 41. The holes 42 are preferably spaced equidistantly from the recess 41. The holes 42 are provided for receiving alignment members 83 of the pilot member 80. The holes 42 preferably comprise generally circular through holes. They are sized to accommodate the alignment members 83 of the pilot member 80.

The back-up plate 40 further includes a plurality of drill guide holes 47. In a preferred embodiment, six such drill guide holes 47 are provided. It will be apparent to those skilled in the art, however that fewer or a greater number of holes 47 can be provided without departing from the spirit of the invention. The drill guide holes 47 are arranged so that when the back-up plate 40 is aligned with the sub-plate 20, each of the drill guide holes 47 on the back-up plate 40 will be aligned with a drill guide hole 28 on the sub-plate 20. Additionally, the drill guide holes 47 are sized so that each drill guide hole 47 is aligned with a correspondingly sized drill guide hole 28 on the sub-plate 20. In this manner, appropriately sized drill guide holes 28, 47 guide a drill bit not only into a door, but out of a door. Advantageously, this ensures that the size of a drilled mounting hole is uniform from the front to the back of a door.

The back-up plate 40 also includes a plurality of holes 48. In a preferred embodiment four such holes 48 are formed. The holes 48 are preferably generally circular and comprise perpendicular through-holes. The holes 48 are provided for attaching back-up plate inserts 120 (see FIGS. 14 and 15) to the back-up plate 40. Specifically, the holes 48 receive screws which attach the back-up plate insert 120 to the back-up plate 40. Accordingly, it is preferred that the holes 48 are internally threaded.

The back-up plate 40 of the present invention provides an important advantage and overcomes a deficiency of prior art devices. Specifically, when the jig assembly 10 of the present invention is used to drill holes in a wood door, the back-up plate 40 prevents splintering or damage to the door. Thus, the back-up plate 40 of the present invention obviates repair of a door after drilling operation and increases the efficiency of installing door hardware.

Attention will now be directed briefly to the chain linkage 60 of the present invention. As stated above, the chain linkage 60 connects the sub-plate 20 to the back-up plate 40. As shown in FIG. 1, the chain linkage 60 comprises a plurality of link units 65. The link units 65 are pivotally connected to each other. Advantageously, the ability of the link units 65 to pivot imparts a degree of flexibility to the chain linkage 60. This flexibility allows the jig assembly 10 to be used with doors of different widths, e.g., one and three-eighths and one and three-quarters inch doors. Specifically, because the chain linkage 60 has flexibility it can fit around doors of different widths. Accordingly, the sub-plate 20 and back-up plate 40 can be placed on opposite sides of doors having a variety of widths. This is indicated schematically by the phantom lines in FIG. 1.

Figure 6:
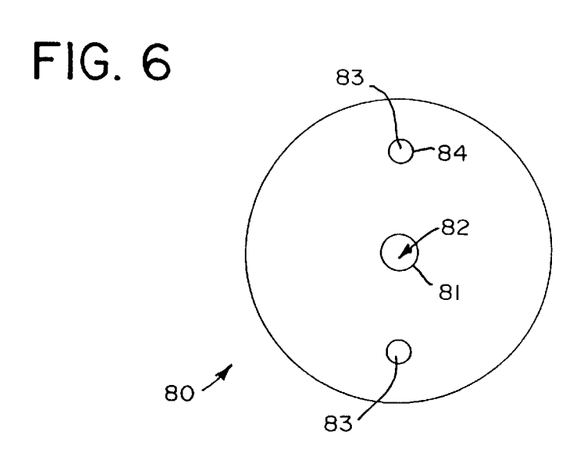
FIG. 6 is a top plan view of a pilot member according to the invention.
Figure 7:
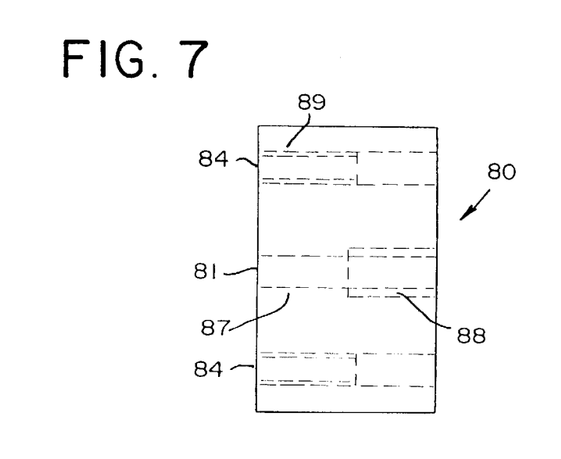
FIG. 7 is a side elevational view of the pilot.
Figure 8:
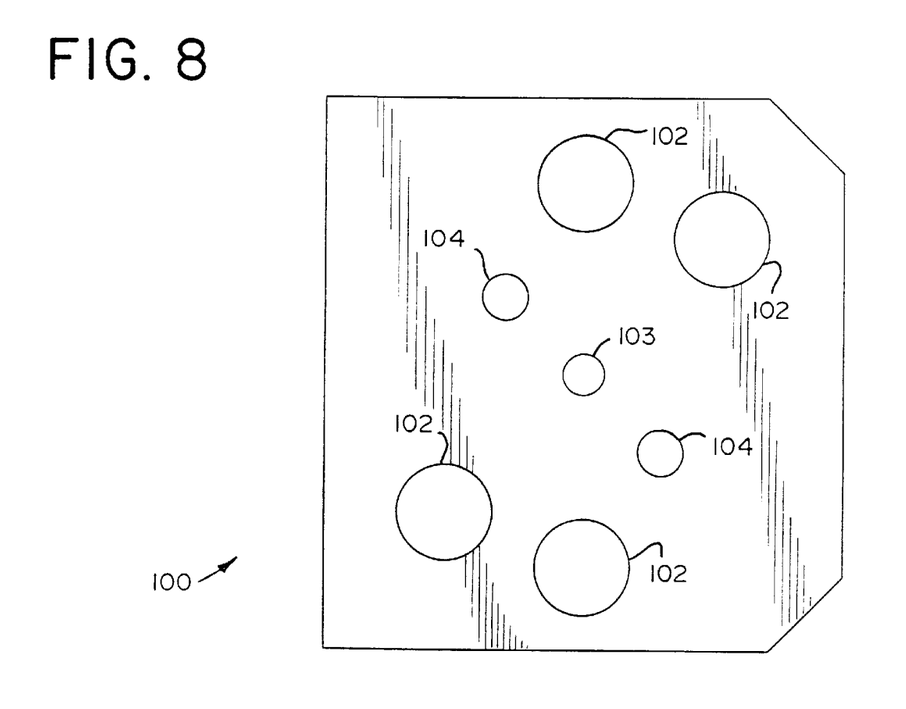
FIGS. 8 and 9 are top plan and side elevational views, respectively, of a first bushing plate according to the invention.
Figure 9:
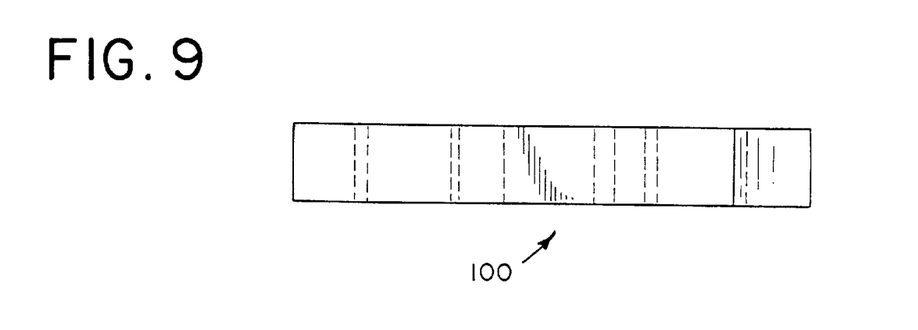

Reference is now invited to FIGS. 6 and 7 which illustrate the pilot member 80 of the present invention. As illustrated, the pilot member 80 preferably has a circular cross-section and is generally cylindrical. This shape is preferred because it facilitates insertion and proper positioning of the pilot member 80 in a main bore of the door. The pilot member 80 includes the central alignment means 82 and the pair of alignment members 83. The alignment means 82 preferably extends through a substantially central bore 81 in the pilot member 80 and projects from both sides of the pilot member 80. The alignment means 82 is received at one projecting end by the sub-plate 20 and at the opposite projecting end by the back-up plate 40. In a preferred embodiment, the alignment means 82 also projects sufficiently far from the pilot member 80 to be received in a corresponding bore 103 in the bushing plate 100.

In a preferred embodiment, the alignment means 82 comprises a composite structure. Specifically, the alignment means 82 preferably includes a dowel pin 85 (not illustrated) and a threaded rod 86. The dowel pin 85 is positioned within the pilot member 80 so that it extends halfway into the bore 81 and projects from a first side 130 (see FIG. 1) of the pilot member 80. The dowel pin 85 is preferably a one-quarter inch dowel pin and a slip-fit within a first half 87 of bore 81. The dowel pin 85 projects from the first side 130 of the pilot member 80 to be received in the sub-plate 20 and a bushing plate 100.

The threaded rod 86 is positioned within the pilot member 80 so that it is received in the second half 88 of the bore 81. In this regard the second half 88 of the bore 81 may be internally threaded for retaining the threaded rod 86. The threaded rod 86 is also positioned in the pilot member 80 so that it projects from an opposite side 135 of the pilot member 80. The threaded rod 86 projects from the opposite side 135 of the pilot member 80 to be received in the back-up plate 40.

The threaded rod 86 is received in the recess 41 of the back-up plate 40. As shown in FIG. 1, the threaded rod 86 preferably protrudes from the recess 41 so that a lock nut or knob 90 may be attached to the threaded rod 86. The lock nut or knob 90, which has corresponding internal threads for engaging the threaded rod 86, is screwed onto the threaded rod 86 so that it is fixed tightly to the threaded rod 86 and abuts the back-up plate 40. In this manner, the jig assembly 10 is secured tightly to a door. Advantageously, the combination of the lock-nut 90, threaded rod 86, and back up plate 40 ensures that the jig assembly 10 is held stationary during a drilling operation and, thus, that correctly positioned and correctly sized holes are formed. Moreover, the combination has been found to hold the jig assembly 10 stationary when used with different types of doors, e.g., wood and steel, thus providing an advantage over the prior art.

The pilot member 80 also includes alignment members 83 spaced on either side of the alignment means 82. Preferably, these alignment members 83 are spaced equidistantly from the alignment means 82. Each of the alignment members 83 is positioned within a bore 84 so that it projects from the second side 135 of the pilot member 80. In particular each alignment member, occupies half the length of a bore 84. The alignment members 83 protrude from the bores 84 and from the second side 135 of the pilot member 80 to be received in holes 42 of the back-up plate 40.

These alignment members 83 help ensure that the back-up plate 40 is aligned with the sub-plate and thus help prevent inadvertent drilling through the surface of the back-up plate 40, instead of the drill guide holes 47. In a preferred embodiment, these alignment members 83 comprise one-quarter inch dowel pins and are press-fit within the bores 84.

The remaining half 89 of each bore 84 is provided for attaching the pilot 80 to the sub-plate 20. Specifically, in use, the bores 84 are aligned with the holes 23 in the sub-plate 20 and screws are inserted through the holes 23 and into the bores 84 to attach the pilot 80 to the sub-plate 20. In this regard, threads may be provided along the half 89 of each bore 84 for retaining these attachment screws.

Attention will now be directed to the bushing plates 100 of the present invention. In this regard, attention is invited to FIGS. 8–13, which show three different types of bushing plates 100 suitable for the present invention. It will be apparent to those skilled in the art, however, that fewer or more bushing plates 100 could be provided without departing from the spirit of the invention. Each bushing plate 100 carries a predetermined pattern of drill bushings 102. The pattern of drill bushings 102 is chosen to correspond to the number, size and spacing of mounting holes required for a particular type of door hardware. For example, the bushing plates 100 may carry a pattern of drill bushings 102 required for SCHLAGE, BESTLOCK, and CORBIN RUSSWIN dead bolts. Accordingly, the bushing plate 100 attached to the sub-plate 20 at any given time depends on the particular type of hardware being installed. The drill bushings 102 are also arranged so that when a bushing plate 100 is attached to the sub-plate 20, each of the drill bushings 102 will be placed over and received in correspondingly sized drill guide holes 28 of the sub-plate 20.

Mounting holes 104 are provided for removably attaching a bushing plate 100 to the sub-plate 20. In particular the mounting holes 104 may receive screws 101 for attaching a bushing plate 100 to the sub-plate 20. In this regard, the mounting holes 104 may be internally threaded. These mounting holes 104 are provided on either side of the substantially central bore 103, which receives one end of the alignment means 82 on the pilot member 80. It will be recalled that the alignment means 82 extends through the pilot 80 and sub-plate 20 to be received in the bore 103 of the bushing plate 100 (see FIG. 1). Both the mounting holes 104 and the central bore 103 are preferably generally circular and preferably comprise through-holes.

Figure 10:
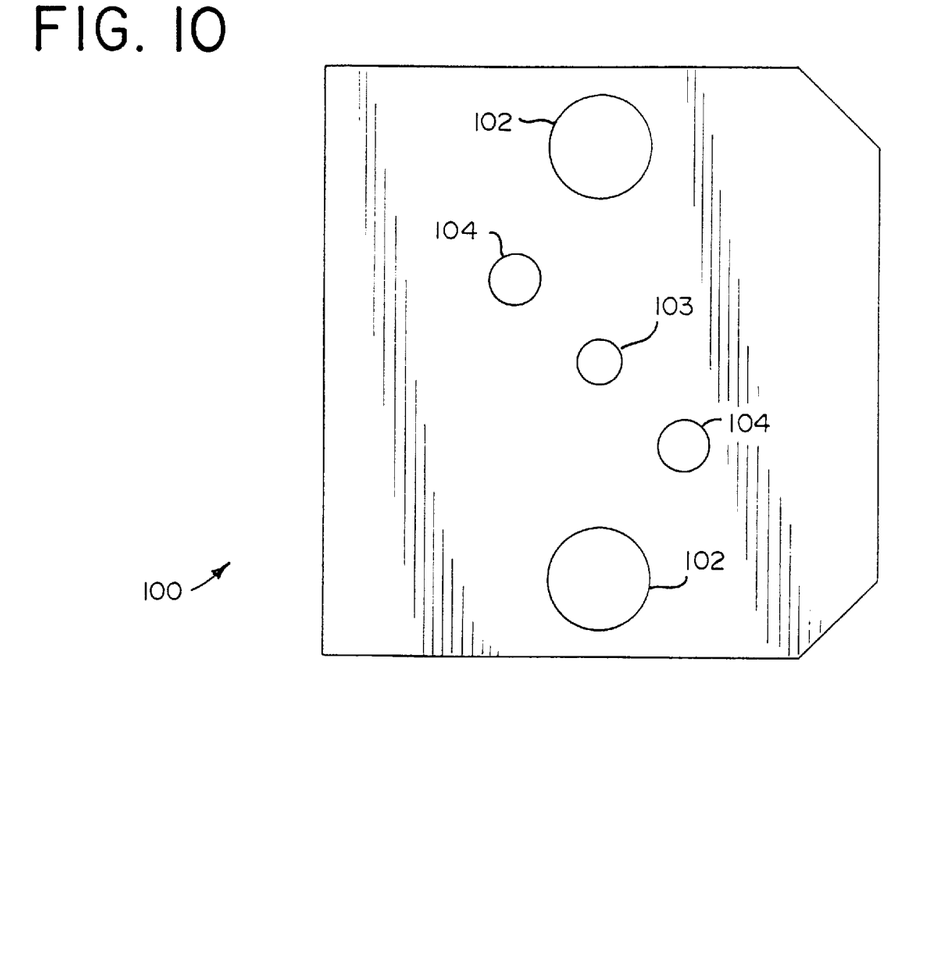
FIGS. 10 and 11 are top plan and side elevational views, respectively, of a second bushing plate according to the invention.
Figure 11:
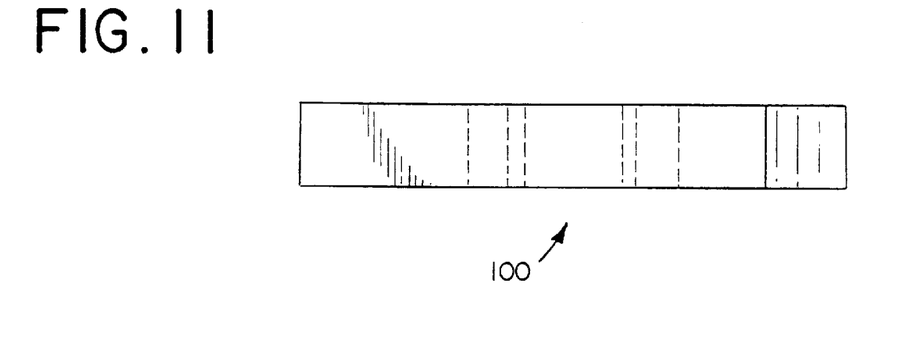
Figure 12:
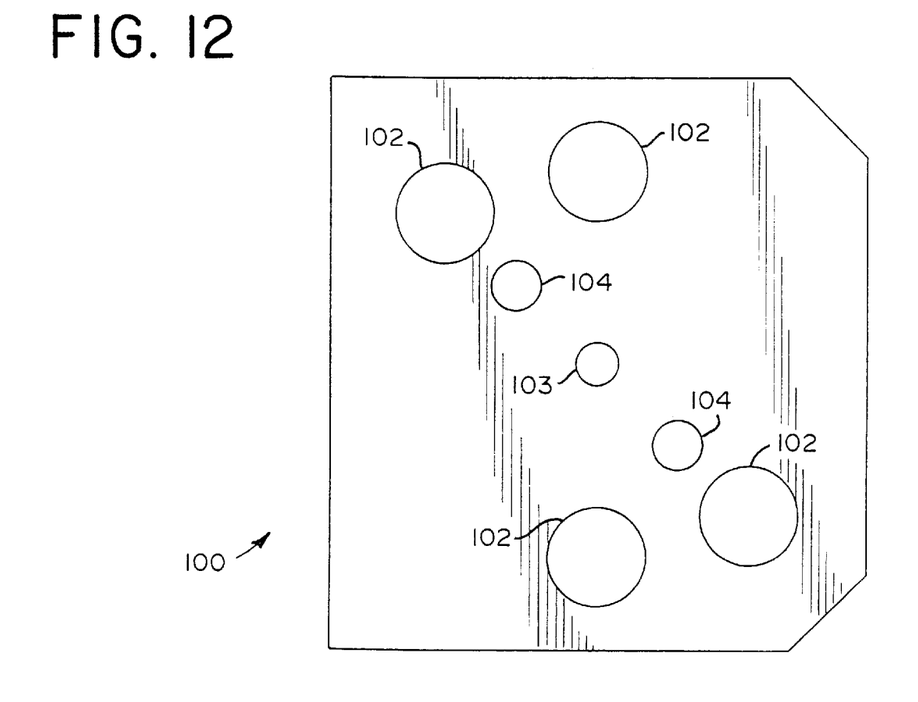
FIGS. 12 and 13 are top plan and side elevational views, respectively, of a third bushing plate according to the invention.
Figure 13:
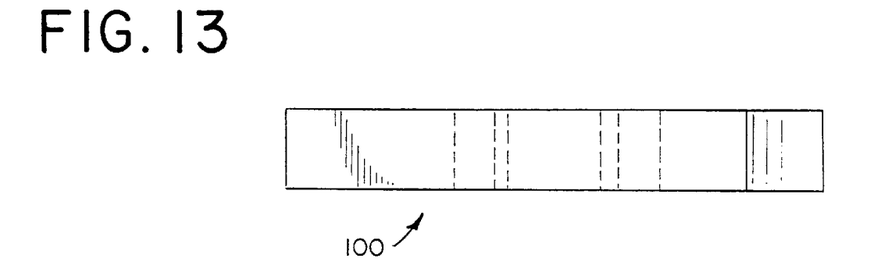
Figures 14, 15:
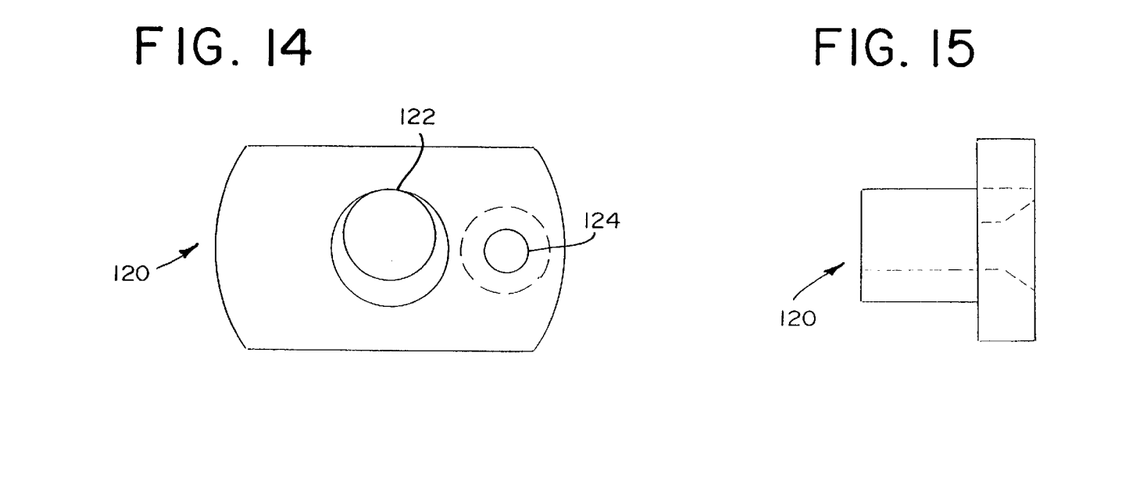
FIGS. 14 and 15 are top plan and side elevational views, respectively, of a back-up plate insert according to the invention.

When either of the bushing plates 100 shown in FIGS. 10, 11 and 12, 13 is attached to the sub-plate 20, back-up plate inserts 120 may be provided for the back-up plate 40. A back-up plate insert 120 is shown in FIGS. 14 and 15, which are top plan and side views, respectively of the insert 120. The back-up plate insert 120 includes a drill guide hole portion 122 and a mounting hole 124. The mounting hole 124 is provided for attaching the back-up plate insert 120 to the back-up plate 40. Specifically, the back-up plate insert 120 is placed on the back-up plate 40 with the mounting hole 124 aligned with a hole 48 of the back-up plate 40. A screw is then placed in the aligned holes 124, 48 to attach the back-up plate insert 120 to the back-up plate 40. Preferably, two such back-plate inserts 120 are used when the bushing plate 100 of FIGS. 10, 11 or 11, 12 is used, with one back-up plate insert 120 being provided on either side of the recess 41.

The back-up plate inserts 120 are attached to the back-up plate 40 so that the drill guide hole portion 122 is inserted into a drill guide hole 47 of the back-up plate 40. The drill guide hole portion 122 of the back-up plate insert 120 provides additional guidance for a drill bit and helps ensure that correctly sized mounting holes are formed. Advantageously, the back-up plate inserts 120 also help support the door and prevent splintering during a drilling operation.

The operation of the present invention should be apparent from the foregoing; however, it will be briefly described. Using the drill jug 10 of the present invention to form door operating mounting holes, first an appropriate bushing plate 100 is chosen and attached to the sub-plate 20. A bushing plate 100 is chosen in accordance with the type of door hardware being installed For example, if a SCHLAGE deadlock were being installed, then the bushing plate 100 of FIGS. 10 and 11 could be chosen. Next, a main bore would be formed in the door at an appropriate spacing from the door edge. The spacing will depend on the hardware being installed, but typical values are two and three-eighths inch or two and three-quarters inch offset. The pilot member 80 of the jig 10 is placed in the main bore to locate the sub-plate 20 with bushing plate 100 attached against the exterior of the door. The pilot member 80 is inserted into the main bore so that it fits snugly and so that the alignment means 82 and members 83 project from the opposite interior side of the door. The sub-plate 20 with bushing plate 100 attached is then aligned with the edge of the door. Next, the back-up plate 40 is placed on the opposite side of the door so that the alignment means 82 and members 83 are received in the recess 41 and holes 42. The alignment means 82 and members 83 insure that the two plates 20, 40 are aligned and substantially parallel to each other. The jig assembly 10 is then secured in place by screwing the lock nut or knob 90 onto the alignment means 82. The lock nut or knob 90 is screwed on until it abuts the back-up plate 40, thereby securing the jig assembly 10 firmly in place. An appropriately sized drill bit may then be inserted into the drill bushings 102 to form the mounting holes. Drilling occurs from one side only. That is, a drill bit is inserted into a drill bushing 102, which is positioned in a drill guide hole 28 of the sub-plate 20 and so that the end of the drill bushing 102 rests against the door, penetrates the door thickness, and exits through an aligned drill guide hole 47 of the back-up plate 40 on the opposite side of the door. Accordingly, the forming of accurate mounting holes is a simple and efficient process.

Thus, an improved drill jig 10 for enabling the accurate formation of door hardware mounting holes has been described. The drill jig 10 of the present invention is formed of aluminum or other durable material and so can be used repeatedly without breaking or warping. The drill jig 10 includes flexible chain linkages 60 and detachable bushing plates 100 and so is suitable for use with a variety of door types and with a variety of door operating hardware. Additionally, the drill jig 10 of the present invention is simple to install and use since it includes its own pilot member 80 for ensuring accurate positioning of the jig 10 on the door, and its own attaching means for securely attaching the jig to a door. Moreover, the back-up plate 40 of the jig 10 prevents damage to the door during a drilling operation.

Although a preferred embodiment of the present invention has been described, it will be apparent to those skilled in the art that various changes and modifications can be made without departing from the spirit of the invention. For example, although in the preferred embodiment bushing plates 100 are attached to the sub-plate 20, the present invention also covers an embodiment in which no sub-plate 20 is used. In such an embodiment, each of the bushing plates 100 would include its own pilot member 80 and would be connected directly and removably to the back-up plate 40 via the chain linkages 60. Accordingly, the present invention is not intended to be limited by the preferred embodiment described.

What is claimed is:

1. An adjustable drill jig for forming door operating hardware mounting holes in a door, said door including a first side, a second opposite side, and an edge connecting said first and second opposite sides, said drill jig comprising
    a first plate adapted to be placed against the first side of the door, said first plate defining a plurality of first drill guide holes;

a second plate attached to said first plate and adapted to be placed against the second opposite side of the door in a position substantially parallel and aligned with that of said first plate when said first plate is placed against the first side of the door, said second plate defining a plurality of second drill guide holes which are aligned with said first drill guide holes of said first plate when said second plate is aligned with said first plate, said second drill guide holes being arranged so that each second drill guide hole is aligned with a correspondingly sized first drill guide hole;

a chain linkage connecting said second plate to said first plate, said chain linkage being adapted for placement around the edge of the door when said first plate is placed against the first side of the door and said second plate is placed against said second opposite side of the door;

alignment means connected to said first plate and capable of attachment to said second plate for ensuring that said second plate is aligned with said first plate, when said first and second plates are placed respectively against said first and second sides of said door;

a plurality of bushing plates capable of attachment to said first plate, each of said bushing plates carrying a predetermined pattern of drill bushings corresponding to a mounting hole pattern for a particular type of door hardware, each said bushing plate being adapted for attachment to said first plate so that each of the drill bushings on the bushing plate is received in a correspondingly sized drill guide hole of said first plate, a preselected one of the bushing plates being removably attached to the first plate in accordance with the particular type of door hardware being installed.

2. An adjustable drill jig according to claim 1 further comprising securing means connected to said first plate and capable of attachment to said second plate for releasably securing said drill jig to the door.

3. An adjustable drill jig according to claim 2 in which said securing means comprises an elongate rod connected to said front plate and a nut receivable on an end of the rod, said rod being inserted through a main bore of the door so that the first plate is located against the first side of the door and so that the end of the rod projects from the second side of the door, said end being received in and projecting from a recess in said second plate, when said second plate is placed against the door and aligned with said first plate, said nut being placed on the end of the rod and tightened into abutment with said second plate to secure the drill jig to the door.

4. An adjustable drill jig according to claim 3 in which said rod is threaded.

5. An adjustable drill jig according to claim 3 in which said nut has gripping portions for facilitating the tightening and untightening of the nut on said rod.

6. An adjustable drill jug according to claim 3 in which said recess comprises a substantially U-shaped channel.

7. An adjustable drill jig according to claim 1 further comprising detachable inserts, which are inserted into preselected second drill guide holes of said second plate when one of a predetermined group of bushing plates is attached to the front plate, said inserts adapting the drill guide holes into which they are inserted for receiving a drill bit of a predetermined size.

8. An adjustable drill jig according to claim 7 in which each of said inserts defines a hole which is concentric with the drill guide hole into which the insert is inserted said hole adapting the drill guide hole for receiving a drill bit of a predetermined size.

9. An adjustable drill jig according to claim 7 in which said inserts each define a mounting hole for attaching the inserts to the second plate.

10. An adjustable drill jig according to claim 1 in which said first plate and said second plate each define six drill guide holes.

11. An adjustable drill jig according to claim 1 in which three bushing plates are provided.

12. An adjustable drill jig according to claim 1 in which said chain linkage is flexible.

13. An adjustable drill jig according to claim 1 in which the first and second plates are connected by first and second chain linkages, the first chain linkage connecting the first and second plates along one side of the jig, the second chain linkage connecting the first and second plates on the opposite side of the jig.

14. An adjustable drill jig according to claim 1 in which said alignment means includes a pilot member connected at one end to the first plate, and a plurality of alignment members attached to and projecting from said pilot member, said pilot member being adapted for insertion into a main bore of the door so that said alignment members project from the second opposite side of the door and so that said first plate is located against the first side of the door, said alignment members being received in recesses in said second plate, when said second plate is placed against the door and aligned with said first plates.

15. An adjustable drill jig according to claim 14 in which said pilot member comprises a substantially cylindrical block.

16. An adjustable drill jig according to claim 14 in which said alignment members comprise substantially elongate rods.

17. An adjustable drill jig according to claim 14 in which at least one of said alignment members extends through the pilot member and into the first plate, so that the alignment member projects from said first plate and is capable of attachment to said bushing plate.

18. An adjustable drill jig according to claim 14 in which a first, a second and a third alignment member are provided, said alignment members being arranged in spaced relation on said pilot member.

19. An adjustable drill jig according to claim 18 in which said first alignment member extends through the center of the pilot and the second and third alignment members are spaced equidistantly from the first alignment member.

20. An adjustable drill jig according to claim 18 in which said first alignment member extends through the pilot and into first plate, so that the first alignment member projects from said first plate and is capable of attachment to said bushing plate.

21. An adjustable drill jig according to claim 18 in which said first alignment member is threaded and said first and second alignment members comprise dowel pins.

22. An adjustable drill jig according to claim 1 in which each drill bushing defines a drill bushing end and each drill bushing is received in a drill guide hole of said first plate so that said drill bushing end projects from said drill guide hole and rests against said first side of said door.

23. An adjustable drill jig for forming door operating hardware mounting holes in a door, said door including a back side, a front side, and an edge connecting said front and back sides, said drill jig comprising:

a back plate adapted to be placed against the back side of the door, said back plate defining a plurality of drill guide holes;

a plurality of front plates capable of connection to said back plate, each of said front plates being adapted for placement against the front side of the door in a position substantially aligned with and parallel to that of said back plate when said back plate is placed against said back side of the door, each of said front plates carrying a predetermined pattern of drill bushings corresponding to a mounting hole pattern for a particular type of door hardware, each of said front plates being adapted for alignment with said back plate so that each of the drill bushings on the front plate are aligned with a correspondingly sized drill guide hole of said black plate, a preselected one of the front plates being connected to the back plate in accordance with the type of door hardware being installed;

alignment means provided on each of said front plates and capable of attachment to said back plate for ensuring that a front plate is aligned with said back plate when a front plate is placed against said front side of the door and said back plate is placed against the back side of the door; and a chain linkage for connecting a front plate to said back plate, said chain linkage being adapted for placement around the edge of the door when said back plate is placed against the back side of the door and a front plate is placed against the front side of the door.

* * * * *